US008815390B2

(12) United States Patent
Lee

(10) Patent No.: US 8,815,390 B2
(45) Date of Patent: Aug. 26, 2014

(54) MATTE BIAXIALLY ORIENTED POLYLACTIC ACID FILM

(75) Inventor: Mark S. Lee, North Kingstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 789 days.

(21) Appl. No.: 12/483,951

(22) Filed: Jun. 12, 2009

(65) Prior Publication Data

US 2010/0009208 A1 Jan. 14, 2010

Related U.S. Application Data

(60) Provisional application No. 61/061,438, filed on Jun. 13, 2008.

(51) Int. Cl.

| | |
|---|---|
| ***B32B 27/06*** | (2006.01) |
| ***B32B 27/08*** | (2006.01) |
| ***B32B 27/18*** | (2006.01) |
| ***B32B 27/20*** | (2006.01) |
| ***B32B 27/30*** | (2006.01) |
| ***B32B 27/32*** | (2006.01) |
| ***B32B 27/36*** | (2006.01) |
| ***C08L 23/02*** | (2006.01) |
| ***C08L 23/04*** | (2006.01) |
| ***C08L 23/08*** | (2006.01) |
| ***C08L 23/10*** | (2006.01) |
| ***C08L 23/12*** | (2006.01) |
| ***C08L 23/14*** | (2006.01) |
| ***C08L 67/04*** | (2006.01) |

(52) U.S. Cl.
USPC ..... 428/349; 428/212; 428/304.4; 428/318.4; 428/319.3; 428/323; 428/327; 428/343; 428/347; 428/480; 428/910; 525/186; 525/190; 528/354; 528/361; 156/244.11; 264/173.16; 264/176.1

(58) Field of Classification Search
None
See application file for complete search history.

(56) References Cited

U.S. PATENT DOCUMENTS

| | | | | |
|---|---|---|---|---|
| 3,929,937 | A * | 12/1975 | Clendinning et al. | 525/190 |
| 4,187,113 | A * | 2/1980 | Mathews et al. | 430/533 |
| 5,216,050 | A * | 6/1993 | Sinclair | 524/108 |
| 5,252,642 | A * | 10/1993 | Sinclair et al. | 524/108 |
| 5,360,646 | A * | 11/1994 | Morita | 438/789 |
| 5,405,887 | A * | 4/1995 | Morita et al. | 521/179 |
| 5,443,780 | A | 8/1995 | Matsumoto et al. | |
| 5,525,706 | A | 6/1996 | Gruber et al. | |
| 5,728,761 | A | 3/1998 | Kuyama et al. | |
| 5,798,435 | A | 8/1998 | Gruber et al. | |
| 5,843,578 | A | 12/1998 | Sasaki et al. | |
| 6,005,068 | A | 12/1999 | Gruber et al. | |
| 6,153,276 | A | 11/2000 | Oya et al. | |
| 6,183,814 | B1 * | 2/2001 | Nangeroni et al. | 427/361 |
| 6,355,772 | B1 | 3/2002 | Gruber et al. | |
| 6,600,008 | B1 * | 7/2003 | Kobayashi et al. | 528/361 |
| 6,645,618 | B2 * | 11/2003 | Hobbs et al. | 428/359 |
| 6,846,606 | B1 * | 1/2005 | Laney et al. | 430/139 |
| 6,867,168 | B2 * | 3/2005 | Laney et al. | 503/227 |
| 7,087,313 | B2 | 8/2006 | Sawai et al. | |
| 7,128,969 | B2 | 10/2006 | Busch et al. | |
| 7,175,917 | B2 | 2/2007 | Sukigara et al. | |
| 7,235,287 | B2 | 6/2007 | Egawa | |
| 7,268,190 | B2 | 9/2007 | Ohme et al. | |
| 7,273,640 | B2 * | 9/2007 | Laney et al. | 428/1.1 |
| 7,348,052 | B2 * | 3/2008 | Mueller et al. | 428/219 |
| 7,354,973 | B2 * | 4/2008 | Flexman | 525/162 |
| 7,368,160 | B2 * | 5/2008 | Inglis | 428/212 |
| 7,381,772 | B2 * | 6/2008 | Flexman et al. | 525/163 |
| 7,390,558 | B2 | 6/2008 | Aritake et al. | |
| 7,413,799 | B2 * | 8/2008 | Hiruma et al. | 428/328 |
| 7,517,937 | B2 | 4/2009 | Yano et al. | |
| 7,548,372 | B2 * | 6/2009 | Ueda et al. | 359/599 |
| 7,820,276 | B2 * | 10/2010 | Sukigara et al. | 428/212 |
| 7,825,212 | B2 | 11/2010 | Ouchi et al. | |
| 7,879,440 | B2 * | 2/2011 | Yatsuzuka et al. | 428/327 |
| 7,951,438 | B2 * | 5/2011 | Lee et al. | 428/35.8 |
| 7,993,745 | B2 | 8/2011 | Narita et al. | |
| 8,048,948 | B2 * | 11/2011 | Shimizu et al. | 524/445 |
| 8,236,893 | B2 | 8/2012 | Nakagawa et al. | |
| 8,268,913 | B2 | 9/2012 | Li et al. | |
| 2003/0039775 | A1 | 2/2003 | Kong | |
| 2004/0023052 | A1 | 2/2004 | Ambroise | |
| 2005/0112296 | A1 | 5/2005 | Laney et al. | |
| 2007/0202320 | A1 * | 8/2007 | Watanabe et al. | 428/327 |
| 2007/0255013 | A1 | 11/2007 | Becraft et al. | |
| 2007/0276090 | A1 | 11/2007 | Aoki et al. | |
| 2009/0148715 | A1 | 6/2009 | Lee | |

FOREIGN PATENT DOCUMENTS

| | | |
|---|---|---|
| EP | 1385899 | 2/2004 |
| JP | 10-251498 | 9/1998 |

OTHER PUBLICATIONS

"Polypropylene—Wikipedia", (http://en.wikipedia.org/wiki/Polypropylene) webpage retrived Dec. 2, 2013.*

International Search Report and Written Opinion mailed Jul. 28, 2009 directed to corresponding international application No. PCT/US09/47251; (10 pages).

Lee, U.S. Office Action mailed Apr. 26, 2012, directed to U.S. Appl. No. 13/363,230; 8 pages.

Lee, U.S. Office Action mailed Sep. 13, 2012, directed to U.S. Appl. No. 13/363,230; 9 pages.

Lee, U.S. Office Action mailed Dec. 19, 2013, directed to U.S. Appl. No. 13/363,230; 9 pages.

* cited by examiner

*Primary Examiner* — Vivian Chen

(74) *Attorney, Agent, or Firm* — Morrison & Foerster LLP

(57) ABSTRACT

A biaxially oriented laminate film including a core layer including a blend of crystalline polylactic acid polymer and a minority amount of polyolefin with a compatibilizing resin which is biaxially oriented such that a matte or opaque appearance is obtained. The laminate film may further have additional layers such as a heat sealable layer disposed on one side of the core layer including an amorphous polylactic acid resin and/or a polylactic acid resin-containing layer disposed on the side of the core layer opposite the heat sealable layer, a metal layer, or combinations thereof.

25 Claims, No Drawings

MATTE BIAXIALLY ORIENTED POLYLACTIC ACID FILM

CROSS-REFERENCE TO RELATED APPLICATION

This application claims the benefit of U.S. Provisional Application Ser. No. 61/061,438, filed Jun. 13, 2008, the entirety of which is incorporated herein by reference.

FIELD OF INVENTION

This invention relates to a multi-layer biaxially oriented polylactic acid (BOPLA) film with a novel formulation and process which can exhibit a matte appearance.

BACKGROUND OF INVENTION

Biaxially oriented polypropylene (BOPP) films used for packaging, decorative, and label applications often perform multiple functions. For example, in laminations they can provide printability, transparent or matte appearance, and/or slip properties. They can further be used to provide a surface suitable for receiving organic or inorganic coatings for gas and moisture barrier properties. They can also be used to provide a heat sealable layer for bag forming and sealing, or a layer that is suitable for receiving an adhesive either by coating or laminating.

However, in recent years, interest in "greener" packaging has been developing. Packaging materials based on biologically derived polymers are increasing due to concerns with renewable resources, raw materials, and greenhouse gases. Bio-based polymers are believed—once fully scaled-up—to help reduce reliance on petroleum, reduce production of greenhouse gases, and can be biodegradable. The biodegradable aspect is of interest to many snack manufacturers so as to provide litter abatement in addition to a lower carbon footprint package. Bio-based polymers such as polylactic acid (PLA)—which is currently derived from corn starch (but can be derived from other plant sugars) and thus, can be considered to be derived from a renewable or sustainable resource—is one of the more popular and commercially available materials available for packaging film applications. Other bio-based polymers such as polyhydroxyalkanoates (PHA) and particularly, polyhydroxybutyrate (PHB) are also of high interest.

Typically, BOPLA films are generally transparent with a high clarity and high gloss. In some packaging applications, this is very desirable for printing graphics with high visual appeal—or "pop"—and to provide high resolution of the images desired. PLA, being a polar polymer, naturally has a high surface energy which helps enable good wettability of the types of printing inks and colors used in packaging. However, there is also a desire in the packaging industry for a non-glossy, matte appearance film for certain graphic applications. A printed matte film typically gives a "paper-like" appearance to the package which has a certain aesthetic advantage and attractiveness for some applications.

Unfortunately, biaxially oriented PLA (BOPLA) film has been found to be limited to relatively low orientation rates when compared to BOPP manufacturing. This has an impact on productivity and cost. Because polylactic acid polymers are highly polar, it has been found that to effectively make BOPLA films, orientation rates typically found with biaxially oriented polyester (OPET) films must be used, e.g. roughly 3× in the machine direction (MD) and 3× in the transverse direction (TD). If BOPLA films are oriented in the transverse direction higher than a nominal 3 or 4×, film breaks are prone to occur and production of BOPLA films cannot be achieved. However, since BOPLA has been targeted to potentially replace BOPP in packaging, the potential cost of BOPLA due to this reduced productivity may be too high allow for BOPLA to effectively replace BOPP.

BOPP film manufacturing typically has a MD orientation rate of 4-5× and a TD orientation rate of 8-10×. Thus, BOPP films are produced much wider than BOPLA films and have a higher production output and customer width programming. Couple this lower productivity with the current price of PLA resin being higher than polypropylene resin, and BOPLA films suffer a severe cost disadvantage.

For BOPP films, matte appearance is generally achieved by using a resin mixture of incompatible resins. Popular blends commercially available generally use a blend of propylene homopolymer with ethylene homopolymer, with low density polyethylene, medium density polyethylene, or high density polyethylene being used. Also commercially available and used are block copolymers of ethylene and propylene which can give a matte appearance. Alternatively, there are also mineral fillers that can be used to give a matte appearance to the film, such as fine talcs or clays U.S. Pat. No. 7,128,969 describes a film composed of a base layer of PLA with a minority component of a thermoplastic or polyolefin such as polypropylene or polyethylene, typically less than 1% by weight of the base layer. Such a formulation is particularly suitable for thermoforming or biaxial stretching by means of pneumatic drawing or other mechanical forming. However, the formulation is not suitable for high transverse orientation rates in excess of 6 TDX; the highest TDX cited in the examples is 5.5. In addition, the small amount of polyolefin used as a drawing aid in the PLA base layer is not enough to produce a suitably consistent matte appearance.

EP Patent No. 01385899 describes a multi-layer film design using a PLA base layer formulated with a cyclic polyolefin copolymer (COC) as a cavitating agent to produce an opaque biaxially oriented PLA film. However, this invention uses a cavitating agent that can be costly to use.

U.S. patent application Ser. No. 12/333,047, the entire contents of which is herein incorporated by reference, describes the use of ethylene-methacrylate copolymers as a process aid to increase significantly the transverse orientation rate of biaxially oriented PLA films. However, the resulting films are transparent, not matte or opaque.

SUMMARY OF THE INVENTION

The above issues of making matte biaxially oriented PLA films productively without incurring potential appearance issues such as non-uniform appearance or gels are addressed by using a suitable incompatible additive and a compatibilizing agent for the PLA. It has been found solutions that when a minority amount of propylene homopolymer, a compatibilizer, is blended with a majority amount of PLA consistent and uniformly fine matte films may be produced.

One embodiment is a multi-layer laminate film including a first layer of a heat sealable resin including an amorphous PLA resin and a second layer including a substantially crystalline PLA resin-containing blend on one side of the sealable amorphous PLA layer. This second crystalline PLA resin-containing blend layer may be considered a core or base layer to provide the bulk strength of the laminate film. The second PLA core layer includes a blend of crystalline PLA homopolymer combined with an optional amount of ethylene-acrylate copolymer that acts as a processing aid to enable high transverse orientation rates of 8-11×. The second PLA core layer may also include an optional amount of amorphous PLA blended with the crystalline PLA. The second PLA core layer also includes inorganic antiblock particles of suitable size, selected from amorphous silicas, aluminosilicates, sodium calcium aluminum silicates, crosslinked silicone polymers, and/or polymethylmethacrylates to act as antiblocks for film handling or machinability. Suitable amounts range from 0.03-0.5% by weight of the core layer and typical particle sizes of 3.0-6.0 μm in diameter.

To impart matte appearance to the PLA-based film, an amount of polyolefin can be added to the core layer, the heat sealable layer, or to both layers. Types of polyolefins contemplated include polypropylene, polyethylene, copolymers of polypropylene or polyethylene (e.g. ethylene-propylene copolymers, propylene-butene copolymers, ethylene-butene copolymers, or ethylene-propylene-butene copolymers, random or block copolymers), or blends thereof. Polypropylene, however, is preferred, particularly polypropylene of higher melt flow rates. The amount of polyolefin to be incorporated into the film layer is about 5-20 wt % of the layer, preferably 10-15 wt %. It is also preferable to use an amount of compatibilizer such as the ethylene-acrylate copolymer processing aid with the polyolefin matte additive as the ethylene-acrylate copolymer acts as a compatibilizer between the polyolefin and the PLA and helps the incompatible polyolefin to disperse within the PLA matrix as a fine dispersion, rendering the film a fine, consistent matte appearance with a minimum of gels.

The first heat sealable layer includes an amorphous PLA resin which provides heat sealable properties to the laminate and also may include various additives such as antiblock particles to allow for easier film handling. Furthermore, the laminate may further include a third PLA resin-containing layer on the second PLA resin-containing core layer opposite the side with the amorphous PLA sealable layer for use as a printing layer or metal receiving layer or coating receiving layer. This third layer of this laminate can include either an amorphous PLA or a crystalline PLA, or blends thereof. This third layer, if used as a print receiving layer, may also incorporate the polyolefin additive to impart a matte appearance, although it is preferable to have the first heat sealable layer or the core layer (or both) as the matte layer.

Preferably, the second PLA resin-containing core layer includes a crystalline polylactic acid homopolymer of about 90-100 wt % L-lactic acid units (or 0-10 wt % D-lactic acid units). An optional amount of amorphous PLA may also be blended in with the crystalline PLA from 0-48 wt % of the core layer. The amorphous PLA is also based on L-lactic acid units but has greater than 10 wt % D-lactic acid units and/or meso-lactide units (which includes one each of L and D lactic acid residuals). An optional amount of ethylene-acrylate copolymer can also be added to the core layer at about 2-10 wt % of the core layer as a process aid for orientation, particularly transverse orientation. Migratory slip additives may also be contemplated to control COF properties such as fatty amides (e.g. erucamide, stearamide, oleamide, etc.) or silicone oils ranging from low molecular weight oils to ultra high molecular weight gels. Suitable amounts of slip additives to use can range from 300 ppm to 10,000 ppm of the layer.

If the multi-layer film is only a single layer or 2-layer film design, it may be useful to also add antiblock particles to the core layer to aid in film handling, film rewinding, and machinability. Suitable antiblock components include amorphous silicas, aluminosilicates, sodium calcium aluminum silicates, crosslinked silicone polymers, and polymethylmethacrylates to aid in machinability and winding and to lower coefficient of friction (COF) properties. Suitable amounts range from 0.03-0.5% by weight of the heat sealable layer and typical particle sizes of 3.0-6.0 μm in diameter, depending on the final thickness of this layer.

Preferably, the first PLA heat sealable resin-containing layer includes an amorphous PLA of greater than 10 wt % D-lactic acid units. It is not necessary to use any of the impact modifier/process aid ethylene-acrylate copolymer in this case, as the amorphous PLA can be oriented relatively easily. This first heat sealable amorphous PLA resin-containing layer can also include an antiblock component selected from amorphous silicas, aluminosilicates, sodium calcium aluminum silicates, crosslinked silicone polymers, and polymethylmethacrylates to aid in machinability and winding and to lower coefficient of friction (COF) properties. Suitable amounts range from 0.03-0.5% by weight of the heat sealable layer and typical particle sizes of 3.0-6.0 μm in diameter, depending on the final thickness of this layer. Migratory slip additives may also be contemplated to control COF properties such as fatty amides (e.g. erucamide, stearamide, oleamide, etc.) or silicone oils ranging from low molecular weight oils to ultra high molecular weight gels. Suitable amounts of slip additives to use can range from 300 ppm to 10,000 ppm of the layer.

Another embodiment may have this first PLA resin-containing layer include a non-heat-sealable amorphous PLA such as a crystalline PLA resin similar to that used in the second PLA resin-containing core layer. In addition, various blends of amorphous and crystalline PLA can be utilized at similar ratios as described for the core layer. In the case that a crystalline PLA is used or a blend including crystalline PLA, an optional amount of the ethylene-acrylate copolymer process aid may be used, again in the amount of 2-10 wt % of this layer to enable transverse orientation at high rates. Preferably, this layer will also contain antiblock particles selected from amorphous silicas, aluminosilicates, sodium calcium aluminum silicates, crosslinked silicone polymers, and polymethylmethacrylates to aid in machinability and winding. Suitable amounts may range from 0.03-0.5% by weight of the core layer and typical particle sizes of 3.0-6.0 μm in diameter, depending on the final thickness of this layer. Migratory slip additives may also be contemplated to control COF properties such as fatty amides (e.g. erucamide, stearamide, oleamide, etc.) or silicone oils ranging from low molecular weight oils to ultra high molecular weight gels, or blends of fatty amides and silicone oil-based materials. Suitable amounts of slip additives to use can range from 300 ppm to 10,000 ppm of the layer.

In yet another embodiment, the second PLA resin-containing core layer may be extruded by itself as a single layer only. As mentioned previously, this layer includes a crystalline polylactic acid homopolymer of about 90-100 wt % L-lactic acid units (or 0-10 wt % D-lactic acid units). An optional amount of amorphous PLA may also be blended in with the crystalline PLA from 0-48 wt % of the core layer. The amorphous PLA is also based on L-lactic acid units but has greater than 10 wt % D-lactic acid units and/or meso-lactide units (which includes one each of L and D lactic acid residuals). An optional amount of ethylene-acrylate copolymer can also be added to the core layer at about 2-10 wt % of the core layer as a process aid for orientation, particularly transverse orientation. Added to the core layer is an amount of polyolefin such as polypropylene, polyethylene, copolymers of polypropylene, copolymers of polyethylene, or blends thereof to provide the matte appearance. Suitable amounts range from 5-20% by weight of the core layer, preferably 10-15 wt %. It is also preferable to add an amount of compatibilizing agent such as the ethylene-acrylate copolymer to aid in dispersion of the polyolefin matte-inducing resin to provide a consistent matte appearance with a minimum of gels. Suitable amount of compatibilizing agent is also 2-10 wt % of the layer. It can be noted that the compatibilizing agent and the process aid for orientation can be one and the same (i.e. if ethylene-acrylate copolymer is used, it can have a dual use for both compatibilizing and dispersing the polyolefin matte agent with the PLA matrix as well as acting as a process aid for high TD orientation if desired).

In the case where the above embodiments are to be used as a substrate for vacuum deposition metallizing, it is recommended that migratory slip additives not be used as these types of materials may adversely affect the metal adhesion or metallized gas barrier properties of the metallized BOPLA film. It is thought that as the hot metal vapor condenses on the film substrate, such fatty amides or silicone oils on the surface of the film may vaporize and cause pin-holing of the metal-deposited layer, thus compromising gas barrier properties. Thus, only non-migratory antiblock materials should be used to control COF and web-handling.

In the case where the above embodiments are to be used as a printing film, it may be advisable to avoid the use of silicone oils, in particular low molecular weight oils, as these may interfere with the print quality of certain ink systems used in process printing applications. However, this depends greatly upon the ink system and printing process used.

For the multi-layer film structures described above, it is preferable to discharge-treat the side of this multi-layer film structure opposite the heat sealable first layer for lamination, metallizing, printing, or coating. A particularly preferred use is for printing. In the case of a 2-layer laminate structure wherein the amorphous PLA sealable layer is contiguous with a crystalline PLA core layer, it is preferable to discharge-treat the side of the core layer opposite the sealable layer for purposes of laminating, printing, metallizing, coating, etc. In the case of a 3-layer laminate structure, it is preferable to discharge-treat the side of the third layer which is contiguous to the side of the core layer opposite the heat sealable first layer. This third layer, as mentioned previously, is often formulated with materials that are conducive to receiving printing inks, metallizing, adhesives, or coatings. In the case of a single layer film, either or both sides of the film can be discharge-treated as desired.

Discharge-treatment in the above embodiments can be accomplished by several means, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ to the exclusion of $O_2$. The laminate film embodiments may further include a vacuum-deposited metal layer on the discharge-treated layer's surface. Preferably, the metal layer has a thickness of about 5 to 100 nm, has an optical density of about 1.5 to 5.0, and includes aluminum, although other metals can be contemplated such as titanium, vanadium, chromium, manganese, iron, cobalt, nickel, copper, zinc, gold, or palladium, or alloys or blends thereof.

Preferably, the laminate film is produced via coextrusion of the heat sealable layer and the blended core layer and other layers if desired, through a compositing die whereupon the molten multilayer film structure is quenched upon a chilled casting roll system or casting roll and water bath system and subsequently oriented in the machine and/or transverse direction into an oriented multi-layer film. Machine direction orientation rate is typically 2.0-3.0× and transverse direction orientation—with the use of the ethylene-acrylate impact modifier process aid—is typically 8.0-11.0×. Otherwise, without the ethylene-acrylate impact modifier process aid, transverse direction orientation may be limited to a lower rate, typically 3.0-6.0×. Heat setting conditions in the TDO oven is also critical to minimize thermal shrinkage effects.

Multi-layer BOPLA film was made using a 1.5-meter wide sequential orientation line process via coextrusion through a die, cast on a chill drum using an electrostatic pinner, oriented in the machine direction through a series of heated and differentially sped rolls, followed by transverse direction stretching in a tenter oven. The multilayer coextruded laminate sheet is coextruded at processing temperatures of ca. 190° C. to 230° C. through a die and cast onto a cooling drum whose surface temperature is controlled between 15° C. and 26° C. to solidify the non-oriented laminate sheet at a casting speed of about 6 mpm. The non-oriented laminate sheet is stretched in the longitudinal direction at about 55° C. to 65° C. at a stretching ratio of about 3 to about 4 times the original length and the resulting stretched sheet is annealed at about 40° C. to 45° C. to obtain a uniaxially oriented laminate sheet. The uniaxially oriented laminate sheet is introduced into a tenter at a linespeed of ca. 18 to 50 mpm and preliminarily heated between about 65° C. and 75° C., and stretched in the transverse direction at about 75° C. to 90° C. at a stretching ratio of about 3-10 times the original width and then heat-set or annealed at about 90° C. to 135° C. to reduce internal stresses due to the orientation and minimize shrinkage and give a relatively thermally stable biaxially oriented sheet.

Although a preferred embodiment is to use the matte film as a printing film, these examples can also be metallized via vapor-deposition, preferably a vapor-deposited aluminum layer, with an optical density of at least about 1.5, preferably with an optical density of about 2.0 to 4.0, and even more preferably between 2.3 and 3.2.

Optionally, an additional third layer specifically formulated for metallizing to provide adequate metal adhesion, metal gloss, and gas barrier properties can be disposed on the second PLA resin-containing core layer, opposite the side with the heat sealable layer. Additionally, this additional layer's surface may also be modified with a discharge treatment to make it suitable for metallizing, laminating, printing, or converter applied adhesives or other coatings.

This invention provides a method to allow the production of matte and opaque appearing BOPLA films using inorganic particles at particular orientation rates and temperatures. Such a film method and composition can result in attractive matte and opaque biaxially oriented PLA films that are more economical than the current art for BOPLA.

Additional advantages of this invention will become readily apparent to those skilled in the art from the following detailed description, wherein only the preferred embodiments of this invention are shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

DETAILED DESCRIPTION OF THE INVENTION

Described are multi-layer biaxially oriented polylactic acid (BOPLA) films produced using novel formulations and processes. The films may exhibit a matte appearance. The films may include formulations with polyolefin additives as a minority component in the film formulation which enables the BOPLA film to become matte in appearance, providing unique aesthetic appearances for printing or other graphic arts use of BOPLA films.

In one embodiment, the laminate film includes a single extruded film of a PLA resin core layer including a crystalline polylactic acid polymer, optionally blended with an amount of an amorphous PLA polymer, an amount of ethylene-acrylate copolymer, and an amount of polyolefin resin, and one or both sides of the crystalline PLA core layer blend can be discharge-treated.

In another embodiment, the laminate film includes a 2-layer coextruded film of: a PLA resin core layer including a crystalline polylactic acid polymer, optionally blended with an amount of an amorphous PLA polymer, an amount of ethylene-acrylate copolymer, and an amount of polyolefin resin; and a heat sealable layer including an amorphous polylactic acid polymer; and the side of the crystalline PLA core layer blend opposite the sealable resin layer is discharge-treated.

In another embodiment, the laminate film can include a similar construction as the 2-layer coextruded film above, except that the amount of polyolefin resin and ethylene-acrylate copolymer includes the heat sealable amorphous PLA polymer instead of the core PLA layer.

In another embodiment, the laminate film can include a similar construction as the 2-layer coextruded film above, except that the amount of polyolefin resin and ethylene-acrylate copolymer includes both the crystalline PLA core layer as well as the heat sealable amorphous PLA polymer.

In yet another embodiment, the laminate film can include a similar 2-layer construction as above, except that a third PLA skin layer may be disposed on the side of the crystalline PLA core layer blend opposite the heat sealable amorphous PLA layer. This third PLA layer can include either crystalline PLA resin or amorphous PLA resin or blends thereof. In the case where crystalline PLA resin is part of this layer's formulation, an amount of ethylene-acrylate copolymer can be incorporated as in the core layer formulation. Generally, it is desirable to discharge-treat the exposed surface of this third layer in order to provide further functionality as a surface to receive metallization, printing, coating, or laminating adhesives.

The polylactic acid resin core layer may include a crystalline polylactic acid of a specific optical isomer content and can be biaxially oriented. As described in U.S. Pat. No. 6,005,068, lactic acid has two optical isomers: L-lactic acid (also known as (S)-lactic acid) and D-lactic acid (also known as (R)-lactic acid). Three forms of lactide can be derived from these lactic acid isomers: L,L-lactide (also known as L-lactide) and which includes two L-lactic acid residuals; D,D-lactide (also known as D-lactide) and which includes two D-lactic acid residuals; and meso-lactide which includes one each of L and D-lactic acid residuals. The degree of crystallinity is determined by relatively long sequences of a particular residual, either long sequences of L or of D-lactic acid. The length of interrupting sequences is important for establishing the degree of crystallinity (or amorphous) and other polymer features such as crystallization rate, melting point, or melt processability.

The crystalline polylactic acid resin is preferably one composed primarily of the L-lactide isomer with minority amounts of either D-lactide or meso-lactide or combinations of D-lactide and meso-lactide. Preferably, the minority amount is D-lactide and the amount of D-lactide is 10 wt % or less of the crystalline PLA polymer. More preferably, the amount of D-lactide is less than about 5 wt %, and even more preferably, less than about 2 wt %. Suitable examples of crystalline PLA for this invention are Natureworks® Ingeo™ 4042D and 4032D. These resins have relative viscosity of about 3.9-4.1, a melting point of about 165-173° C., a crystallization temperature of about 100-120° C., a glass transition temperature of about 55-62° C., a D-lactide content of about 4.25 wt % and 1.40 wt % respectively, density of about 1.25 g/cm$^3$, and a maximum residual lactide in the polylactide polymer of about 0.30% as determined by gas chromatography. Molecular weight $M_W$ is typically about 200,000; $M_n$ typically about 100,000; polydispersity about 2.0. Natureworks® 4032D is the more preferred crystalline PLA resin, being more crystalline than 4042D and more suitable for high heat biaxial orientation conditions. In addition, the 4042D PLA grade contains about 1000 ppm of erucamide and for some applications, particularly for gas barrier metallizing, may not be suitable.

The core resin layer is typically 8 μm to 100 μm in thickness after biaxial orientation, preferably between 10 μm and 50 μm, and more preferably between about 15 μm and 25 μm in thickness. A preferred embodiment is to use the higher crystalline, higher L-lactide content PLA (lower wt % D-lactide of about 1.40) such as Natureworks® 4032D.

The core layer can also optionally include an amount of amorphous PLA resin to improve further extrusion processing and oriented film processing. The addition of amorphous PLA in the core layer helps to lower extrusion polymer pressure and in terms of film manufacturing, helps to reduce or slow crystallization rate of the newly oriented film. This aids in the orientation of the PLA film in both MD and TD and helps reduce defects such as uneven stretch marks. It also helps with the slitting of the biaxially oriented film at the edge-trimming section of the line by reducing the brittleness of the edge trim and reducing the instances of edge trim breaks which can be an obstacle to good productivity. The amorphous PLA is preferably based on a L-lactide isomer with D-lactide content of greater than 10 wt %. A suitable amorphous PLA to use is Natureworks® Ingeo™ 4060D grade. This resin has a relative viscosity of about 3.25-3.75, $T_g$ of about 52-58° C., seal initiation temperature of about 80° C., density of about 1.24 g/cm$^3$, a D-lactide content of about 12 wt %, and a maximum residual lactide in the polylactide polymer of about 0.30% as determined by gas chromatography. Molecular weight $M_W$ is about 180,000. Suitable amounts of amorphous PLA to use in the core are concentrations of up to about 48 wt % of the core layer, preferably up to about 30 wt % of the core layer, and even more preferably about 15-20 wt % of the core layer. It should be noted, however, that too much amorphous PLA in the core layer (e.g. 50% or greater) can cause high thermal shrinkage rates after biaxial orientation and in spite of heat-setting conditions in the transverse orientation oven to make a thermally stable film. A thermally, dimensionally stable film is important if the substrate is to be used as a metallizing, printing, coating, or laminating substrate. (However, if the BOPLA is desired as a shrinkable film, this composition and appropriate processing conditions might be suitable.)

One aspect of the invention is blending into the core layer a minority amount of ethylene-acrylate copolymer as a processing aid in orientation, in particular, to enable high transverse orientation rates (TDX) similar to that used in BOPP orientation (e.g. 8-10 TDX). Ethylene-acrylates are of the general chemical formula of $CH_2{=}C(R^1)CO_2R^2$ where $R^1$ can be hydrogen or an alkyl group of 1-8 carbon atoms and $R^2$ is an alkyl group of 1-8 carbon atoms. Ethylene-acrylate copolymers contemplated for this invention can be based on ethylene-acrylate, ethylene-methacrylate, ethylene-n-butyl acrylate-glycidyl methacrylate, ethylene-glycidyl methacrylate, ethylene-butyl-acrylate, ethylene acrylic esters, or blends thereof. Ethylene vinyl acetate (EVA) and ethylene methacrylate (EMA) can also be contemplated. Other similar materials may also be contemplated. As described in U.S. Pat. No. 7,354,973, suitable compositions of the ethylene-acrylate copolymers can be about 20-95 wt % ethylene content copolymerized with about 3-70 wt % n-butyl acrylate and about 0.5-25 wt % glycidyl methacrylate monomers. A particularly suitable ethylene-acrylate copolymer of this type is one produced by E. I. DuPont de Nemours and Company Packaging and Industrial Polymers Biomax® Strong 120. This additive has a density of about 0.94 g/cm$^3$, a melt flow rate of about 12 g/10 minutes at 190° C./2.16 kg weight, a melting point of about 72° C., and a glass transition temperature of about −55° C. Other suitable ethylene-acrylate copolymer impact modifiers commercially available are: DuPont Elvaloy® PTW, Rohm & Haas, Inc. BPM500, and Arkema, Inc. Biostrength® 130.

Suitable amounts of ethylene-acrylate copolymer to be blended in the core layer including crystalline PLA may include from 2-10 wt % of the core layer, preferably 2-7 wt % and more preferably, 2-4 wt %. At these concentrations, acceptable clarity of the biaxially oriented film is maintained. Too much ethylene-acrylate may cause haziness; too little may not enable transverse orientation at 8-10×. Blending into the core layer can be done most economically by dry-blending the respective resin pellets; it is contemplated that more aggressive blending such as melt-compounding via single-screw or twin-screw can result in better dispersion of the ethylene-acrylate copolymer throughout the PLA matrix.

To obtain the matte appearance of the oriented PLA film, an amount of polyolefin resin is added to the core layer of the laminate film. The polyolefin resin can include propylene homopolymer, ethylene homopolymer (e.g. high density polyethylene, medium density polyethylene, low density polyethylene, linear low density polyethylene), butene homopolymer, copolymers of ethylene, propylene, and butene (e.g. ethylene-propylene copolymer, propylene-butene copolymer, ethylene-butene copolymer, ethylene-propylene-butene copolymer), and blends thereof. The copolymers may be random or block copolymers. Additionally, polystyrene and copolymers thereof could be contemplated. Preferably, the polyolefin resin is a propylene homopolymer or propylene-based copolymer. A suitable propylene homopolymer can be ExxonMobil PP1044 which has a melt flow rate of nominal 18.5 g/10 minutes at 230° C. and a density of about 0.9 g/cm$^3$. This grade is typically an injection molding grade and as such, has a relatively high melt flow rate, and is typically extruded at 200-250° C. (390-480° F.), at similar process temperatures as the polylactic acid polymer. Other similar polypropylenes can be contemplated, the preference being for a high melt flow polypropylene (or propylene copolymer) as a high melt flow polyolefin is easier to process and disperse throughout the PLA matrix. Preferred amounts of polyolefin to add to the PLA layer for matte appearance are from 5-20 wt % of the layer, preferably 10-15 wt %. Too much polypropylene or polyolefin added to the PLA layer can cause processing issues such as film breaks and can affect the biodegradable properties of the film such that it cannot degrade or decompose within a time frame to be considered compostable or degradable for some standardized tests (e.g. ASTM D-6400 (ISO 1629) "Compostable Plastics"); too little polypropylene or polyolefin can result in a film that does not exhibit a suitably matte appearance.

In addition, it is preferable to include with the polyolefin additive into the PLA layer, an amount of compatibilizing resin. A suitable compatibilizing resin can be an ethylene-acrylate copolymer as described previously. Thus, an ethylene-acrylate copolymer can perform double-duty as both a processing aid for high transverse orientation as well as for helping compatibilize the polyolefin with the PLA. However, even if one chooses to transversely orient the laminate film at a lower stretch rate which does not require the use of the process aid, it is generally preferable to still include the compatibilizer as it helps with the dispersion of the polyolefin throughout the PLA layer. Suitable amounts of compatibilizer to add is about 2-10 wt % of the layer, preferably 2-4 wt %. In addition to ethylene-acrylate copolymer as a compatibilizer, other materials can also act as a compatibilizer such as Kraton® FG1924X maleic-anhydride modified linear styrene-ethylene-butene triblock copolymer with nominal 13 wt % styrene, 0.7-1.3 wt % maleic anhydride, 0.90 g/m$^3$ density, melt index at 230° C. of 40 g/10 minutes, solution viscosity of 19,000 cps, and styrene/rubber ratio of 13/87. It is contemplated that other maleic anhydride modified polymers or materials can also be used as compatibilizers.

Without being bound by any theory, it is believed that it is the inherent incompatibility of the polyolefin additive with the polylactic acid polymer matrix layer that causes the matte appearance. The polyolefin resin form a domains throughout the PLA. However, the degree and quality of the matte appearance is dependent on how well the polyolefin additive is dispersed throughout the PLA matrix layer. If the polyolefin additive is not well dispersed, an inconsistent matte or hazy film results, and in the worst case, gels form and film breaks can occur. Thus, the use of a compatibilizing resin is important to help disperse the polyolefin finely and produce a consistent matte appearance without gels and can process efficiently. The choice of using a polyolefin with a relatively high melt flow rate (e.g. polypropylene injection molding grade) also aids in the dispersion of the polyolefin throughout the PLA layer.

In the embodiments of multi-layer coextruded polylactic acid film laminates, it is contemplated that the additives to produce a matte PLA layer can be employed in any of the layers as desired. Thus, for a 2-layer embodiment, the polyolefin and compatibilizer may be added to the core layer or the coextruded skin layer, or both layers as desired to impart the desired matte appearance. Similarly, with a 3-layer embodiment, all 3 layers can include the polyolefin and compatibilizer with the PLA resin or just one of the layers. A preferred embodiment is to use the polyolefin and compatibilizer as part of the skin layer (e.g. heat sealable layer) opposite the side of the laminate which will receive the graphic printing in order to maximize the matte appearance of the graphic printing. Another embodiment may utilize the polyolefin/compatibilizer additives in the core layer as well, with one side of the core layer being the print receiving side.

In the embodiment of a 2-layer coextruded multilayer film, the core resin layer can be surface treated on the side opposite the skin layer with either an electrical corona-discharge treatment method, flame treatment, atmospheric plasma, or corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide is particularly preferred. This method results in a treated surface that includes nitrogen-bearing functional groups, preferably at least 0.3 atomic % or more, and more preferably, at least 0.5 atomic % or more. This treated core layer is then well suited for subsequent purposes of metallizing, printing, coating, or laminating, the preferably embodiment being for printing.

In this embodiment of a 2-layer laminate film, it is also possible to add optional amounts of migratory slip agents such as fatty amides and/or silicone oils in the core layer to aid further with controlling coefficient of friction (COF) and web handling issues. Suitable types of fatty amides are those such as stearamide or erucamide and similar types, in amounts of 100-1000 ppm of the core. Preferably, stearamide is used at 400-600 ppm of the core layer. A suitable silicone oil that can be used is a low molecular weight oil of 350 centistokes which blooms to the surface readily at a loading of 400-600 ppm of the core layer. However, if the films of this invention are desired to be used for metallizing or high definition process printing, it is recommended that the use of migratory slip additives be avoided in order to maintain metallized barrier properties and adhesion or to maintain high printing quality in terms of ink adhesion and reduced ink dot gain. In this case, it is recommended that coefficient of friction control and web handling is resolved using inorganic antiblock particles similar to those already described.

The coextruded skin layer can be a heat sealable resin layer including an amorphous polylactic acid polymer. As described earlier, the amorphous PLA is preferably based on a L-lactide isomer with D-lactide content of greater than 10 wt %. A suitable amorphous PLA to use is Natureworks® Ingeo™ 4060D grade. This resin has a relative viscosity of about 3.25-3.75, $T_g$ of about 52-58° C., seal initiation temperature of about 80° C., density of about 1.24 g/cm$^3$, a D-lactide content of about 12 wt %, and a maximum residual lactide in the polylactide polymer of about 0.30% as determined by gas chromatography. Molecular weight $M_W$ is about 180,000. The preferred amount to be used as a heat sealable skin layer is about 100 wt % of the layer. It is also preferred to add an amount of inorganic antiblock to this layer to aid in web-handling, COF control, film winding, and static control, among other properties. Suitable amounts would be about 1000-5000 ppm of the heat sealable resin layer, preferably 3000-5000 ppm.

Preferred types of antiblock are spherical crosslinked silicone polymer such as Toshiba Silicone's Tospearl® grades of polymethlysilsesquioxane of nominal 2.0 and 3.0 μm sizes. Alternatively, sodium aluminum calcium silicates of nominal 3 μm in diameter can also be used (such as Mizusawa Silton® JC-30), but other suitable spherical inorganic antiblocks can be used including polymethylmethacrylate, silicas, and silicates, and ranging in size from 2 μm to 6 μm. Migratory slip agents such as fatty amides or silicone oils can also be optionally added to the heat seal resin layer of types and quantities mentioned previously if lower COF is desired. However, if the films of this invention are desired to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain.

A heat sealable resin layer can be coextruded on one side of the core layer, the heat sealable layer having a thickness after biaxial orientation of between 0.5 and 5 μm, preferably between 1.0 and 2.0 μm. The core layer thickness can be of any desired thickness after biaxial orientation, but preferred and useful thicknesses are in the range of 10 μm to 100 μm, preferably 13.5 μm to 25 μm, and even more preferably 15.0 μm-20.0 μm. The coextrusion process includes a multi-layered compositing die, such as a two- or three-layer die. In the case of a 2-layer coextruded film, a two-layer compositing die can be used. In the case of a 3-layer coextruded film, the polymer blend core layer can be sandwiched between the heat sealable resin layer and a third layer using a three-layer compositing die. One embodiment is to coextrude in only two layers with only the blended core layer and the heat sealable layer coextruded on one side of the core layer. In this case, the core layer side opposite the heat sealable layer is further modified by adding inorganic antiblock particles into the core layer itself as explained previously and can also be surface-treated via a discharge-treatment method if so desired. In a three-layer coextruded film embodiment, a third layer on the side of the core layer opposite the heat sealable layer can also be modified with antiblock particles in lieu of the core layer and also is surface-treated via a discharge-treatment method as desired. Selection of the third layer can include any polymer typically compatible with the core layer resin such as a crystalline PLA resin, amorphous PLA resin, or blends thereof. Typically, selection of this third layer's formulation is to enhance the coextruded film's printability, appearance, metallizability, winding, laminating, sealability, or other useful characteristics. Useful thickness of this third layer after biaxial orientation can be similar to the thicknesses cited for the heat sealable skin layer, preferably 1.0-2.0 μm.

The surface opposite the heat sealable layer can be surface-treated if desired with either a corona-discharge method, flame treatment, atmospheric plasma, or corona discharge in a controlled atmosphere of nitrogen, carbon dioxide, or a mixture thereof which excludes oxygen. The latter treatment method in a mixture of CO2 and N2 only is preferred. This method of discharge treatment results in a treated surface that includes nitrogen-bearing functional groups, preferably 0.3% or more nitrogen in atomic %, and more preferably 0.5% or more nitrogen in atomic %. This discharge-treated surface can then be metallized, printed, coated, or extrusion or adhesive laminated. Preferably, it is printed or metallized, and more preferably, metallized.

If the three-layer coextruded film embodiment is chosen, the third layer may be coextruded with the core layer opposite the heat sealable resin layer, having a thickness after biaxial orientation between 0.5 and 5 μm, preferably between 0.5 and 3 μm, and more preferably between 1.0 and 2.0 μm. A suitable material for this layer is a crystalline PLA or amorphous PLA or blends thereof, as described earlier in the description. If amorphous PLA is used, the same suitable resin grade used for the heat sealable layer may be employed (e.g. Natureworks® 4060D). If crystalline PLA is used, the same suitable grades as used for the core layer may be employed such as Natureworks® 4042D or 4032D, with the 4032D grade preferred in general. Additionally, blends of both crystalline and amorphous PLA may be contemplated for this layer, similar to previously described formulations for the core layer, but not limited to those descriptions. For example, the ratio of amorphous PLA to crystalline PLA for this third skin layer can range from 0-100 wt % amorphous PLA and 100-0 wt % crystalline PLA. In those embodiments in which crystalline PLA is used in the third layer, an amount of ethylene-acrylate copolymer may be used as described previously, in order to ensure the ability to transversely orient this layer at high orientation rates. Suitable amounts of ethylene-acrylate copolymer to use in this skin layer are 2-10 wt %, preferably 2-7 wt % and, more preferably, 3-5 wt %. The use of various blends of amorphous and crystalline PLA in this layer may make it more suitable for printing, metallizing, coating, or laminating, and the exact ratio of the blend can be optimized for these different applications.

This third layer may also advantageously contain an anti-blocking agent and/or slip additives for good machinability and a low coefficient of friction in about 0.01-0.5% by weight of the third layer, preferably about 250-1000 ppm. Preferably, non-migratory inorganic slip and/or antiblock additives as described previously should be used to maintain gas barrier properties and metal adhesion if metallizing, or ink wetting and ink adhesion if printing.

In addition, another embodiment that can be considered is to replace the heat sealable amorphous PLA layer with a non-sealable PLA layer. In this variation, amorphous or crystalline PLA may be used, or blends thereof. In the case of making this layer non-sealable, preferably crystalline PLA should be used, either by itself or as the majority component of a blend with amorphous PLA. As discussed previously, if crystalline PLA is used for this layer, an amount of ethylene-acrylate copolymer may be used as part of this layer to aid high transverse orientation rates. Suitable amounts of ethylene-acrylate copolymer to use in this skin layer are 2-10 wt %, preferably 2-7 wt % and, more preferably, 3-5 wt %. Preferably, non-migratory inorganic slip and/or antiblock additives as described previously should be used to maintain gas barrier properties and metal adhesion if metallizing, or ink wetting and ink adhesion if printing. It is also preferred to add an amount of inorganic antiblock to this layer to aid in web-handling, COF control, film winding, and static control, among other properties. Suitable amounts would be about 1000-5000 ppm of the this non-eat sealable resin layer, preferably 3000-5000 ppm. Preferred types of antiblock are spherical crosslinked silicone polymer such as Toshiba Silicone's Tospearl® grades of polymethlysilsesquioxane of nominal 2.0 and 3.0 μm sizes. Alternatively, sodium aluminum calcium silicates of nominal 3 μm in diameter can also be used (such as Mizusawa Silton® JC-30), but other suitable spherical inorganic antiblocks can be used including polymethylmethacrylate, silicas, and silicates, and ranging in size from 2 μm to 6 μm. It is often preferred to discharge-treat the exposed side of this layer so as to enable adequate adhesion and wet-out of adhesives or inks or coatings to this side. In particular, cold seal latexes can be applied to this discharge-treat surface.

The multilayer coextruded film can be made either by sequential biaxial orientation or simultaneous biaxial orientation which are well-known processes in the art. In the case of sequential orientation, a 1.5-meter wide sequential orientation film-making line was used. The multilayer coextruded laminate sheet was coextruded at melt temperatures of about 190° C. to 230° C. and cast and pinned—using electrostatic pinning—onto a cooling drum whose surface temperature was controlled between 15° C. and 26° C. to solidify the non-oriented laminate sheet at a casting speed of about 6 mpm. The non-oriented laminate sheet was stretched first in the longitudinal direction at about 55° C. to 65° C. at a stretching ratio of about 2 to about 4 times the original length, preferably about 2.5-3.0 times, using differentially heated and sped rollers and the resulting stretched sheet is heat-set at about 40-45° C. on annealing rollers and cooled at about 30-40° C. on cooling rollers to obtain a uniaxially oriented laminate sheet. The uniaxially oriented laminate sheet is then introduced into a tenter at a linespeed of about 18-50 mpm and preliminarily heated between 65° C. and 75° C., and stretched in the transverse direction at a temperature of about 75-90° C. at a stretching ratio of about 3 to about 10 times, preferably about 6-8 times (which may require the use of the stretching aid as described previously), the original width and then heat-set or annealed at about 90-135° C., and preferably 115-130° C., to reduce internal stresses due to the orientation and minimize shrinkage and give a relatively thermally stable biaxially oriented sheet. TD orientation rates were adjusted by moving the transverse direction rails in or out per specified increments based on the TD infeed rail width settings and width of the incoming machine-direction oriented film. The biaxially oriented film has a total thickness between 10 and 100 μm, preferably between 15 and 30 μm, and most preferably between 17.5 and 20 μm.

One embodiment is to metallize the discharge-treated surface opposite the heat sealable resin layer. The unmetallized laminate sheet is first wound in a roll. The roll is placed in a vacuum metallizing chamber and the metal vapor-deposited on the discharge-treated metal receiving layer surface. The metal film may include titanium, vanadium, chromium, manganese, iron, cobalt, nickel, copper, zinc, aluminum, gold, or palladium, the preferred being aluminum. Metal oxides can also be contemplated, the preferred being aluminum oxide. The metal layer can have a thickness between 5 and 100 nm, preferably between 20 and 80 nm, more preferably between 30 and 60 nm; and an optical density between 1.5 and 5.0, preferably between 2.0 and 4.0, more preferably between 2.2 and 3.2. The metallized film is then tested for oxygen and moisture gas permeability, optical density, metal adhesion, metal appearance and gloss, heat seal performance, tensile properties, thermal dimensional stability, and can be made into a laminate structure.

This invention will be better understood with reference to the following examples, which are intended to illustrate specific embodiments within the overall scope of the invention.

EXAMPLE 1

A 2-layer coextruded biaxially oriented PLA film was made using sequential orientation on a 1.5 meter wide tenter frame line, including a core layer (A) substantially of Natureworks® 4032D at about 75 wt % of the core layer and dry-blended with about 15 wt % of DuPont Elvaloy® PTW and about 10 wt % of ExxonMobil PP1044 polypropylene. The coextruded heat sealable skin layer (B) comprised substantially of Natureworks® 4060D at about 94 wt % of the skin layer. An antiblock masterbatch of nominal 5 μm amorphous silica (5 wt % silica in amorphous PLA carrier resin) produced by Clariant under the grade name Oman® bl-698585 was also added to the coextruded heat sealable skin layer at about 6 wt % of the skin layer for an effective antiblock loading of 3000 ppm.

The total thickness of this film substrate after biaxial orientation was ca. 80 G or 0.8 mil or 20 μm. The thickness of the respective heat sealable resin layer after biaxial orientation was ca. 6 G (1.5 μm). The thickness of the core layer after biaxial orientation was ca. 74 G (18.5 μm). The skin layer and the core layer were melt coextruded together through a flat die to be cast on a chill drum using an electrostatic pinner. The formed cast sheet was passed through a machine-direction orienter to stretch in the machine direction (MD) at ca. 3.25× stretch ratio in the longitudinal direction. This was followed by transverse direction (TD) stretching at ca. 8.5× stretch ratio in the tenter oven. The resultant biaxially oriented film was subsequently discharge-treated on the skin layer's surface opposite the heat sealable skin layer via corona treatment. The film was then wound up in roll form.

EXAMPLE 2

The process described in Example 1 was repeated except that the core layer formulation was changed to about 66 wt % PLA 4032D, 15 wt % PLA 4060D, 4 wt % Biomax® 120, and 15 wt % PP1044.

EXAMPLE 3

The process described in Example 1 was repeated except that the core layer formulation was changed to about 60 wt % PLA 4032D, 15 wt % PLA 4060D, 10 wt % Elvaloy® PTW, and 15 wt % PP1044.

EXAMPLE 4

The process described in Example 3 was repeated except that the core layer formulation was changed to about 10 wt % Kraton® FG1924X instead of the Elvaloy® PTW.

COMPARATIVE EXAMPLE 1

The process described in Example 1 was repeated except that the core layer formulation was changed to about 96 wt % 4032D was 96 wt % and 4 wt % Biomax® 120. No PP1044 polypropylene was added.

COMPARATIVE EXAMPLE 2

The process described in Example 1 was repeated except that the core layer formulation was changed to about 99 wt % 4032D and 1 wt % PP1044 polypropylene was added. No compatibilizer resin was added.

The unlaminated properties of the Examples ("Ex") and Comparative Examples ("CEx.") are shown in Table 1.

TABLE 1

| Sample | Layer Composition wt % of the layer<br>Layer A (Core) | Layer B (Heat Seal) | MDX | TDX | Gloss 60° A-side | Gloss 20° B-side | Haze % | Light Transm % |
|---|---|---|---|---|---|---|---|---|
| Ex. 1 | PLA 4032D (75%)<br>PP1044 (10%)<br>Elvaloy PTW (15%) | PLA 4060D 94%)<br>bl-698585 (6%) | 3.25 | 8.5 | 89 | 14 | 62.8 | 88.8 |
| Ex. 2 | PLA 4032D (66%)<br>PLA 4060D (15%)<br>PP1044 (15%)<br>Biomax 120 (4%) | Same as Ex. 1 | 3.25 | 8.5 | 74 | 26.3 | 86.9 | 76.6 |
| Ex. 3 | PLA 4032D (60%)<br>PLA 4060D (15%)<br>PP1044 (15%)<br>Elvaloy (10%) | Same as Ex. 1 | 3.25 | 8.5 | 65 | 18.7 | 97.9 | 71.1 |
| Ex. 4 | PLA 4032D (60%)<br>PLA 4060D (15%)<br>PP1044 (15%)<br>Kraton FG1924X (10%) | Same as Ex. 1 | 3.25 | 8.5 | 72.7 | 7 | 97.2 | 72.3 |
| CEx. 1 | PLA 4032D (96%)<br>Biomax 120 (4%) | Same as Ex. 1 | 3.25 | 8.5 | 122 | 98 | 6.8 | 92.3 |
| CEx. 2 | PLA 4032D (99%)<br>PP1044 (1%) | Same as Ex. 1 | 3.0 | 4.6* | 106 | 83 | 30.2 | 89 |

*Highest TDX achieved before film breakage

As Table 1 shows, Comparative Example 1 (CEx. 1), which is a control film using PLA 4032D at 96 wt % and Biomax 120 at 4% wt of the core layer (A), had excellent appearance with low haze of 6.8%, high light transmission of 92.3%, and high gloss on both sides of the core layer and skin layer of 122 and 98 respectively. Because of Biomax 120's effectiveness as a stretching aid, transverse orientation to 8.5 is achievable. CEx. 1 did not exhibit any matte appearance but was transparent.

Comparative Example 2 (CEx. 2) used a core layer (A) blend of 99% wt PLA 4032D and 1% wt ExxonMobil PP1044 propylene homopolymer. The skin layer (B) was the same as CEx. 1. No compatibilizing additive was used in the core layer; hence, the transverse orientation rate could only get to 4.6 before film breakage became common. The amount of propylene homopolymer provides some matte appearance as shown by the increase in haze (30.2%), decrease in light transmission (89%), and decreases in both sides' gloss. However, the degree of gloss for the core side is still quite good being over 100, and this comparative example does not have enough of a matte appearance. Moreover, some large gels are apparent in the film. Also, because no stretching aid/compatibilizer was used, transverse orientation rate was limited to 4.6 due to a loss of operability with many film breaks.

Example 1 (Ex. 1) had a core layer (A) formulation which included a quantity of compatibilizer and process aid Elvaloy® PTW of 15 wt % of the core layer blended with 10% wt PP1044 propylene homopolymer, and the remainder 75% wt PLA 4032D. Appearance of the film showed a very fine, consistent matte appearance, with high haze of 62.8%, light transmission of 88.8%, and low gloss on both the core layer and skin layer surfaces of 89 and 14 respectively. The film appearance was virtually gel-free. TD orientation rate easily achieved 8.5× with no loss of operability.

Example 2 (Ex. 2) had a core layer (A) formulation which included a quantity of compatibilizer and process aid Biomax® 120 at 4 wt % of the core layer blended with 15 wt % PP1044 propylene homopolymer, and the remainder a blend of 66 wt % PLA 4032D and 15 wt % PLA 4060D. Appearance of the film showed a very fine, consistent matte appearance, with high haze of 86.9%, light transmission of 76.6%, and low gloss on both the core layer and skin layer surfaces of 74 and 26.3 respectively. The film appearance was virtually gel-free. TD orientation rate easily achieved 8.5× with no loss of operability. It is believed that the increase of propylene homopolymer from 10 wt % to 15 wt % of the layer helped increase the haze level and make a more matte appearing film when compared to Ex. 1.

Example 3 (Ex. 3) had a core layer (A) formulation which included a quantity of compatibilizer and process aid Elvaloy® PTW at 10 wt % of the core layer blended with 15 wt % PP1044 propylene homopolymer, and the remainder a blend of 60 wt % PLA 4032D and 15 wt % PLA 4060D. Appearance of the film also showed a very fine, consistent matte appearance, with very high haze of 97.9%, low light transmission of 71.1%, and low gloss on both the core layer and skin layer surfaces of 65 and 18.7 respectively. The film appearance was virtually gel-free. TD orientation rate easily achieved 8.5× with no loss of operability.

Example 4 (Ex. 4) had a core layer (A) formulation which included a quantity of compatibilizer and process aid Kraton® FG1924X at 10 wt % of the core layer blended with 15 wt % PP 1044 propylene homopolymer, and the remainder a blend of 60 wt % PLA 4032D and 15 wt % PLA 4060D. Appearance of the film also showed a very fine, consistent matte appearance, with very high haze of 97.2%, low light transmission of 72.3%, and low gloss on both the core layer and skin layer surfaces of 72.7 and 7 respectively. The film appearance was virtually gel-free. TD orientation rate easily achieved 8.5× with no loss of operability.

As the Examples show above, a method has been shown how the combination of an amount of incompatible polyolefin and polylactic acid polymer can produce a uniformly matte oriented PLA films. Unexpectedly, an amount of compatibilizing resin combined with the polyolefin additive can also improve the matte appearance and reduce gel formation as well as allow transverse orientation of the film at higher rates.

TEST METHODS

The various properties in the above examples were measured by the following methods:

Transparency of the film was measured by measuring the haze of a single sheet of film using a hazemeter model like a BYK Gardner "Haze-Gard Plus®" substantially in accordance with ASTM D1003. Preferred values for haze were about 50% or higher, 80% or higher, or 90% or higher for a matte appearance.

Gloss of the film was measured by measuring the desired side of a single sheet of film via a surface reflectivity gloss meter (BYK Gardner Micro-Gloss) substantially in accordance with ASTM D2457. The A-side or core layer side was measured at a 60° angle; the B-side or skin layer side was measured at a 20° angle. Preferred value for A-side gloss was less than 90% for a matte appearance.

Light transmission of the film was measured by measuring light transmission of a single sheet of film via a light transmission meter (BYK Gardner Haze-Gard Plus) substantially in accordance with ASTM D1003. Preferred values for light transmission were less than 90% for a matte film.

Transverse orientation obtained was measured by varying the stretching and outlet zones' chain rail widths in relation to the in-feed rail settings of the transverse direction orientation (TDO) oven section. The comparison in width between inlet and stretch was used to calculate TD orientation ratio obtained.

This application discloses several numerical ranges. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

I claim:

1. A film comprising:

a first layer consisting of one or more polylactic acid polymers, at least 5 wt % by weight of the first layer of a propylene homopolymer matting agent or a propylene-based copolymer matting agent to provide the film a matte appearance with a haze greater than 50% and light transmission of 71.1% to less than 90%, optionally an ethylene-acrylate copolymer, and optionally one or more migratory slip agents.

2. The film of claim 1, wherein the first layer comprises a crystalline polylactic acid polymer of 90-100 wt % L-lactic acid units.

3. The film of claim 2, further comprising a second heat sealable layer comprising an amorphous polylactic acid polymer having greater than 10 wt % D-lactic acid units and meso-lactide units on one side of the first layer.

4. The film of claim 3, wherein the side of the first layer opposite the second layer is discharge-treated.

5. The film of claim 3, wherein the second heat sealable layer further comprises a polyolefin resin.

6. The film of claim 3, further comprising a third layer comprising a polylactic acid polymer on a side of the first layer opposite the second layer.

7. The film of claim 1, wherein the film is a single layer extruded film.

8. The film of claim 1, wherein the film is a multilayer extruded film.

9. The film of claim 1, wherein the first layer contains the ethylene-acrylate copolymer.

10. The film of claim 1, wherein at least one side of the first layer is discharge-treated.

11. The film of claim 1, wherein the film is biaxially oriented.

12. A film comprising:

a first layer consisting of a crystalline polylactic acid polymer of 90-100 wt % L-lactic acid units and at least 5 wt % by weight of the first layer of a propylene homopolymer matting agent or a propylene-based copolymer matting agent to provide the film a matte appearance with a haze greater than 50% and light transmission of 71.1% to less than 90%, optionally an ethylene-acrylate copolymer, and optionally one or more migratory slip agents; and a second heat sealable layer comprising an amorphous polylactic acid polymer having greater than 10 wt % D-lactic acid units and meso-lactide units on one side of the first layer.

13. The film of claim 12, wherein the second heat sealable layer further comprises a polyolefin resin.

14. The film of claim 12, wherein the first layer contains the ethylene-acrylate copolymer.

15. The film of claim 12, further comprising a third layer comprising a polylactic acid polymer on a side of the first layer opposite the second layer.

16. The film of claim 12, wherein the film is biaxially oriented.

17. A method of making a film comprising:

extruding a first layer consisting of one or more polylactic acid polymers, at least 5 wt % by weight of the first layer of a propylene homopolymer matting agent or a propylene-based copolymer matting agent to provide the film a matte appearance with a haze greater than 50% and light transmission of 71.1% to less than 90%, optionally an ethylene-acrylate copolymer, and optionally one or more migratory slip agents.

18. The method of claim 17, further comprising biaxially orienting the film.

19. The method of claim 17, wherein the first layer comprises a crystalline polylactic acid polymer of 90-100 wt % L-lactic acid units.

20. The method of claim 19, further comprising co-extruding a second heat sealable layer comprising an amorphous polylactic acid polymer having greater than 10 wt % D-lactic acid units and meso-lactide units on one side of the first layer.

21. The method of claim 20, further comprising discharge treating the side of the first layer opposite the second layer.

22. The method of claim 20, wherein the second heat sealable layer further comprises a polyolefin resin.

23. The method of claim 20, further comprising co-extruding a third layer comprising a polylactic acid polymer on a side of the first layer opposite the second layer.

24. The method of claim 17, wherein the first layer further comprises the ethylene-acrylate copolymer.

25. The method of claim 17, further comprising discharge treating at least one side of the first layer.

* * * * *